(12) United States Patent
Shen

(10) Patent No.: US 8,152,403 B2
(45) Date of Patent: Apr. 10, 2012

(54) THREE-WAY CONNECTOR FOR CABINET FRAME

(76) Inventor: Suizhang Shen, Tianjin (CN)

( * ) Notice: Subject to any disclaimer, the term of this patent is extended or adjusted under 35 U.S.C. 154(b) by 0 days.

(21) Appl. No.: 12/894,192

(22) Filed: Sep. 30, 2010

(65) Prior Publication Data
US 2011/0020057 A1    Jan. 27, 2011

Related U.S. Application Data

(63) Continuation of application No. PCT/CN2009/072354, filed on Jun. 19, 2009.

(30) Foreign Application Priority Data

Sep. 28, 2008 (CN) .......................... 2008 1 0151946

(51) Int. Cl.
*A47B 43/00* (2006.01)
(52) U.S. Cl. ........ 403/171; 403/176; 211/182; 211/189; 312/265.1; 312/265.4
(58) Field of Classification Search .................. 403/169, 403/170, 171, 176; 211/182, 189; 312/257.1, 312/265.1, 265.4
See application file for complete search history.

(56) References Cited

U.S. PATENT DOCUMENTS

| | | | | |
|---|---|---|---|---|
| 4,691,970 A | * | 9/1987 | Neri | 312/265.5 |
| 4,726,701 A | * | 2/1988 | Thomas | 403/176 |
| 5,020,866 A | * | 6/1991 | McIlwraith | 312/265.4 |
| 6,062,664 A | * | 5/2000 | Benner | 312/265.1 |
| 6,174,034 B1 | * | 1/2001 | Benner et al. | 312/265.4 |
| 6,902,068 B1 | * | 6/2005 | Fontana et al. | 211/189 |
| 7,896,177 B1 | * | 3/2011 | Toma | 211/182 |

* cited by examiner

*Primary Examiner* — Michael P Ferguson
(74) *Attorney, Agent, or Firm* — Matthias Scholl P.C.; Matthias Scholl

(57) ABSTRACT

A three-way connector for a cabinet frame, including a body 1, multiple positioning columns 4, 8, a pair of M6 tapping holes 7, a pair of M6 tapping holes 11, a M12 tapping hole 3, a ten-folded section 6, and a fifteen-folded section 10. A pair of triangular corners 2 is disposed on both sides of the body 1. The M12 tapping hole 3 is disposed at the top of the body 1. The positioning columns 4 are fit with a cavity of the ten-folded section 6. The M6 tapping holes 7 are disposed on the positioning columns 4, and fit with an installation hole of the ten-folded section 6. The positioning columns 8 are fit with a cavity of the fifteen-folded section 10, and are parallel to each other. The M6 tapping holes 11 are disposed on the positioning columns 8.

4 Claims, 2 Drawing Sheets

THREE-WAY CONNECTOR FOR CABINET FRAME

CROSS-REFERENCE TO RELATED APPLICATIONS

This application is a continuation of International Patent Application No. PCT/CN2009/072354 with an international filing date of Jun. 19, 2009, designating the United States, now pending, and further claims priority benefits to Chinese Patent Application No. 200810151946.2 filed on Sep. 28, 2008. The contents of all of the aforementioned applications, including any intervening amendments thereto, are incorporated herein by reference.

BACKGROUND OF THE INVENTION

1. Field of the Invention

The invention relates to a component for a cabinet frame, and more particularly to a three-way connector for a cabinet frame.

2. Description of the Related Art

With development of high or low voltage distribution industries, and increase in requirements for technical performance thereof such as practice, safety and so on, requirements for performance of a cabinet section are increasingly high, and therefore requirements for forms, positions and dimensional accuracy of an internal frame thereof are correspondingly high, and performance and accuracy thereof are expected to be improved. Conventionally, the frame is formed by using a square nut, cutting corners of a ten-folded section, assembling and welding a fifteen-folded section. However, the frame easily deforms, features poor positioning, and cannot ensure accurate installation dimensions.

SUMMARY OF THE INVENTION

In view of the above-described problem, it is one objective of the invention to provide a three-way connector for a cabinet frame that uses four positioning columns whereby ensuring position accuracy of a section. After accurate positioning, the three-way connector is welded with the section forming the frame whereby ensuring a form, a position, and dimensional accuracy of the frame.

To achieve the above objectives, in accordance with one embodiment of the invention, provided is a three-way connector for a cabinet frame, comprising a body 1, multiple positioning columns 4, 8, a pair of M6 tapping holes 7, a pair of M6 tapping holes 11, a M12 tapping hole 3, a ten-folded section 6, and a fifteen-folded section 10, a pair of triangular corners 2 are disposed on both sides of the body 1, the M12 tapping hole 3 is disposed at the top of the body 1, the positioning columns 4 are fit with a cavity of the ten-folded section 6, the M6 tapping holes 7 are disposed on the positioning columns 4, and fit with an installation hole of the ten-folded section 6, the positioning columns 8 are fit with a cavity of the fifteen-folded section 10, and parallel to each other, the M6 tapping holes 11 are disposed on the positioning columns 8, and fit with an installation hole of the fifteen-folded section 10, an angle between the positioning columns 4 is 90 degrees, and an angle between the positioning columns 4 and the positioning columns 8 is 90 degrees.

Advantages of the invention include: 1) the connector is made of Q235B-type steel (referring to China National Standard) that having the same material with the cabinet frame, which makes it convenient to connect the invention to the cabinet frame, and features great intensity, accurate positioning, and convenient field production; 2) the installation hole corresponding to the frame is disposed on the body, the three-way connector connects sections of two types of cabinet frames altogether, and thus the sections are accurately positioned, then the cabinet frames are formed via welding, the section is connected to the three-way connector via a hexagonal nut, and the M12 tapping hole disposed at the top thereof is for installation of a ring of the cabinet; 3) the invention ensures accurate welding and positioning of the cabinet frame, and improves intensity of the frame whereby making it not easy to deform; 4) processing of cutting corners of the section is not required, which reduces production processes; 5) the cabinet frame has good appearance after welding, and installation of other components of the cabinet is ensured.

DETAILED DESCRIPTION OF THE EMBODIMENTS

Figure 1:
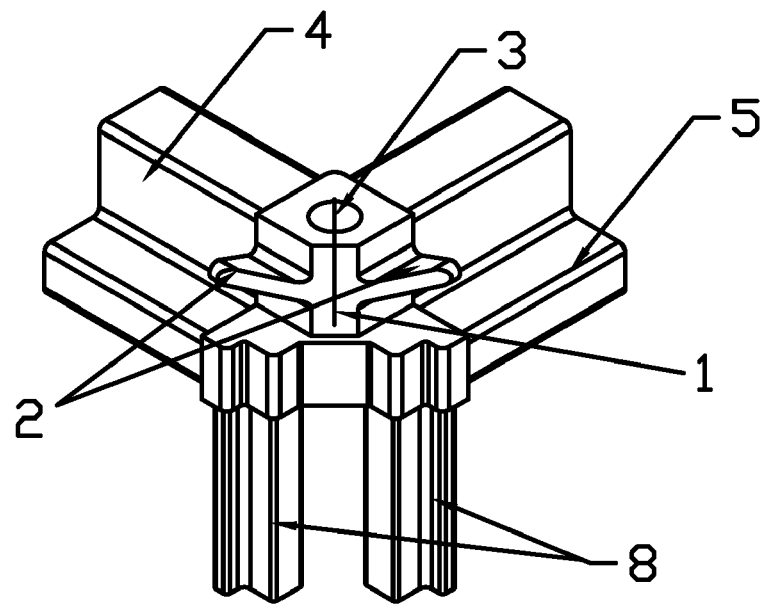
FIG. 1 is a schematic view of a three-way connector for a cabinet frame of an exemplary embodiment of the invention.
Figure 2:
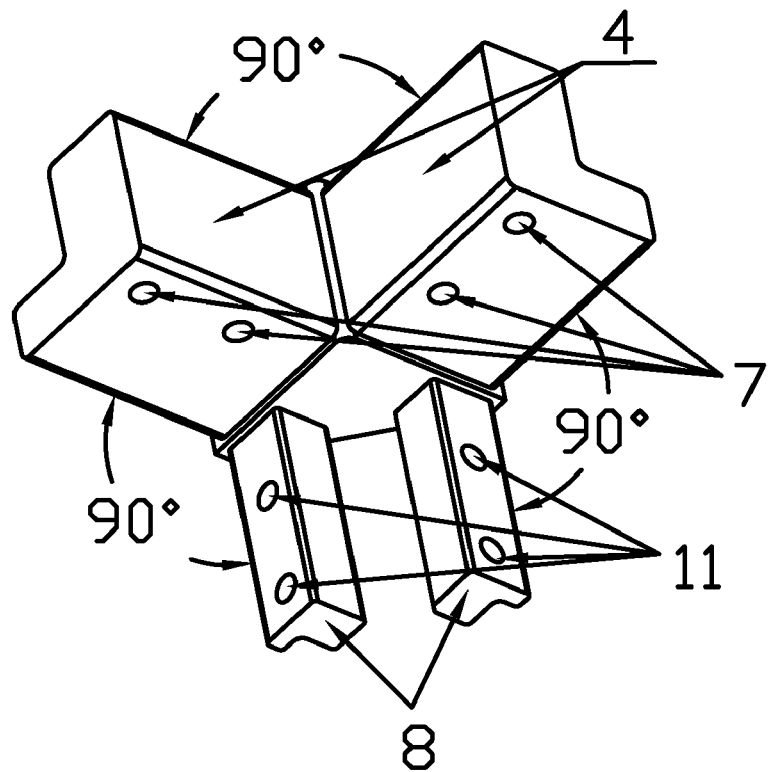
FIG. 2 is a schematic view of a tapping hole of the invention.
Figure 3:
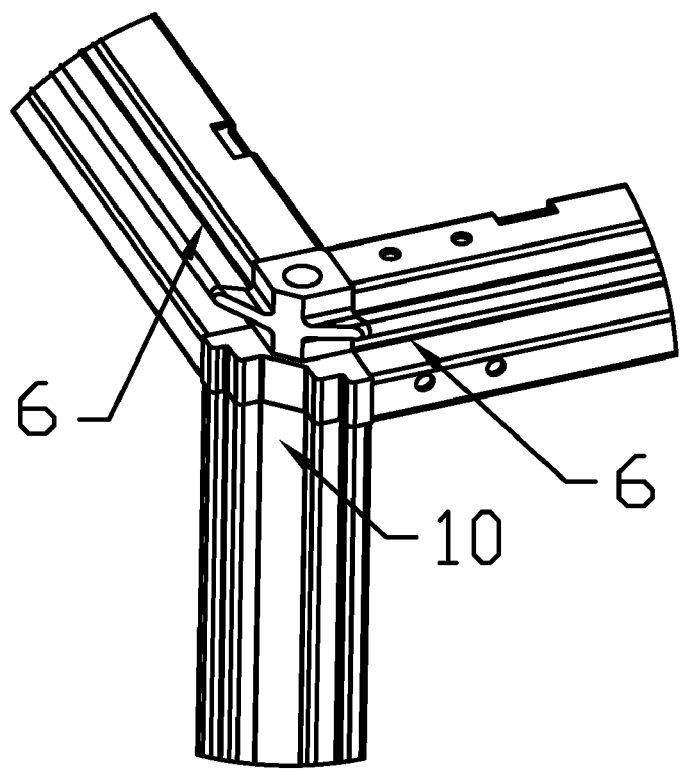
FIG. 3 illustrates assembling between the invention and a section of a cabinet frame.
Figure 4:
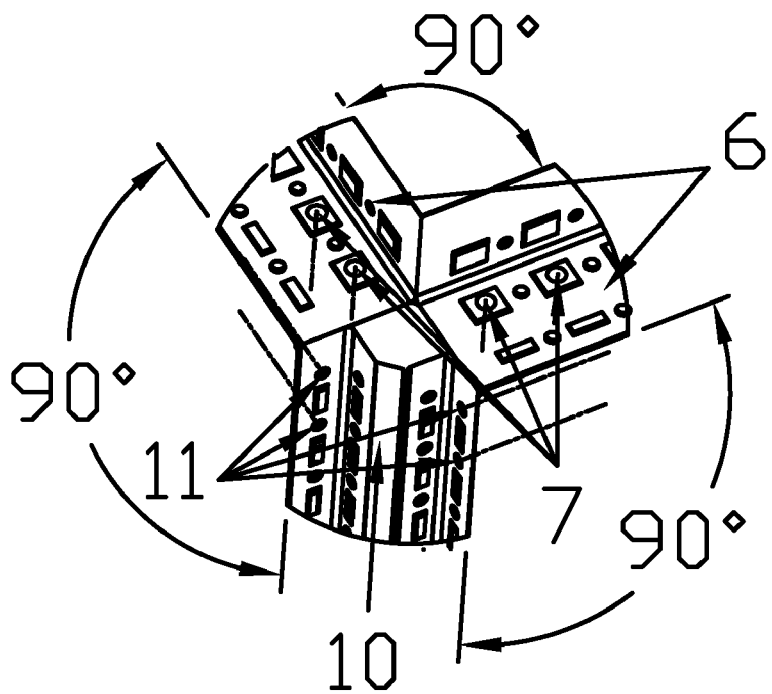
FIG. 4 illustrates assembling between a tapping hole and a bolt.

As shown in FIGS. 1-4, a three-way connector for a cabinet frame comprises a body 1, multiple positioning columns 4, and 8, a pair of M6 tapping holes 7, a pair of M6 tapping holes 11, a M12 tapping hole 3, a ten-folded section 6, and a fifteen-folded section 10.

A shape of the body 1 corresponds to that of the cabinet frame.

A pair of triangular corners 2 is disposed on both sides of the body 1, whereby ensuring good appearance of the cabinet frame after welding, and matching between the cabinet frame and the fifteen-folded section.

The M12 tapping hole 3 is disposed at the top of the body 1, which makes it convenient for installation of a ring of the cabinet.

The positioning columns 4 is fit with a cavity of the ten-folded section 6, and an angle between the positioning columns 4 is 90 degrees, which ensure accurate positioning thereof.

The M6 tapping holes 7 are disposed on the positioning columns 4, and fit with an installation hole of the ten-folded section 6, whereby ensuring installation requirements for bolts, and enabling the three-way connector to be tightly connected to the section.

The positioning columns 8 are fit with a cavity of the fifteen-folded section 10, and parallel to each other, which ensure accurate positioning.

The M6 tapping holes 11 are disposed on the positioning columns 8, and fit with an installation hole of the fifteen-folded section 10, whereby ensuring installation requirements for bolts, and enabling the three-way connector to be tightly connected to the section.

An angle between the positioning columns 4 and the positioning columns 8 is 90 degrees.

The tapping hole corresponding to the frame is disposed on the body 1, the three-way connector connects sections of two types of cabinet frames altogether, and thus the sections are accurately positioned, then the cabinet frames are formed via welding, the section is connected to the three-way connector via a hexagonal nut, and the M12 tapping hole 3 disposed at the top thereof is for installation of a ring of the cabinet.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A three-way connector for in combination with a cabinet frame, the cabinet frame comprising two longitudinally extending hollow first sections each comprising sheet material having ten longitudinally extending peripheral folds defining, respectively, within a first of the first sections a first cavity and within a second of the first sections a second cavity; and a longitudinally extending hollow second section comprising sheet material having fifteen longitudinally extending peripheral folds defining a third cavity and a fourth cavity; the three-way connector comprising:
 a body having a bottom side, a first lateral side, a second lateral side, a third lateral side, and a fourth lateral side;
 four positioning columns; and
 a pair of triangular corner plates for abutting an end of a respective one of said first sections;
wherein
 said bottom side is connected to said first lateral side, said bottom side is connected to said second lateral side, said bottom side is connected to said third lateral side, and said bottom side is connected to said fourth lateral side;
 said first lateral side is adjacent to said second lateral side and said fourth lateral side, said first lateral side is parallel to said third lateral side, and said second lateral side is parallel to said fourth lateral side;
 one of said pair of triangular corner plates is connected to said first lateral side and another of said pair of triangular corner plates is connected to said second lateral side;
 a first one of said four positioning columns fits into the first cavity, a second one of said four positioning columns fits into the second cavity, a third one of said four positioning columns fits into the third cavity, and a fourth one of said four positioning columns fits into the fourth cavity; and
 said first one of said four positioning columns and said second one of said four positioning columns form a 90 degree angle with respect to one another; said first one of said four positioning columns and said third one of said four positioning columns form a 90 degree angle with respect to one another; said second one of said four positioning columns and said fourth one of said four positioning columns form a 90 degree angle with respect to one another; said third one of said four positioning columns is parallel to said fourth one of said four positioning columns;
 said first one of said four positioning columns is connected to said third lateral side; said second one of said four positioning columns is connected to said fourth lateral side; and said third one and said fourth one of said four positioning columns are connected to said bottom side;
 said one of said pair of triangular corner plates is perpendicular to said first lateral side, and said another of said pair of triangular corner plates is perpendicular to said second side; and
 said pair of triangular corner plates is parallel to said bottom side.

2. The combination of claim 1 further comprising an M12 tapping hole for installation of a lifting ring of the cabinet frame; wherein said M12 tapping hole is disposed at the top of said body.

3. The combination of claim 2 further comprising a plurality of M6 taping holes for passing through hexagonal nuts to connect the three-way connector with the two first sections and with the second section, wherein said M6 tapping holes are disposed on said positioning columns and align with installation holes of said two first sections and with installation holes of said second section.

4. The combination of claim 1 wherein said triangular corner plates serve for coordinating assembly of the three-way connector.

* * * * *